United States Patent Office 3,745,163
Patented July 10, 1973

3,745,163
2,2,6,6-TETRAMETHYL PIPERIDINYL-4-(DIALKYL-HYDROXY-BENZOYL OR PHENYL ALKANOYL) HYDRAZONES
Brian Holt, Royton, Donald Richard Randell, Stockport, and James Jack, Bramhall, England, assignors to Ciba-Geigy Corporation, Ardsley, N.Y.
No Drawing. Filed Mar. 13, 1972, Ser. No. 234,333
Int. Cl. C07d 29/30
U.S. Cl. 260—293.76         8 Claims

ABSTRACT OF THE DISCLOSURE

New acyl hydrazones of 2,2,6,6-tetramethylpiperidin-4-one are used as stabilizers for organic materials.

---

The present invention concerns new piperidine derivatives and in particular new acyl hydrazones of 2,2,6,6-tetramethylpiperidin-4-one and hydrazides of alkyl substituted p-hydroxy aryl- or alkyl substituted p-hydroxy aralkyl acids useful as stabilisers for polymers, particularly polyolefins.

According to the present invention there are provided compounds having the formula:

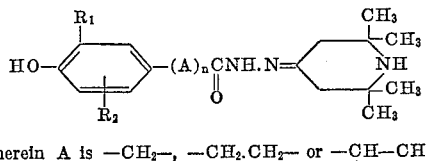

wherein A is —CH$_2$—, —CH$_2$.CH$_2$— or —CH—CH$_2$—,
                                                    |
                                                    CH$_3$ R$_1$ and R$_2$ are the same or different and each is a straight- or branched-chain alkyl group having from 1 to 6 carbon atoms, and $n$ is 0 or 1; as well as the acid salts of these compounds.

Examples of substituents R$_1$ and R$_2$ are methyl, ethyl, n-propyl, isopropyl, sec. butyl, t-butyl, t-pentyl (1,1-dimethylpropyl) and t-hexyl (1,1-dimethylbutyl). Preferably one or both of R$_1$ and R$_2$ are t-butyl, although it is understood that it is unlikely that bulky groups such as the t-butyl group will be on adjacent carbon atoms of the phenyl residue.

Examples of acyl hydrazones include:

2,2,6,6-tetramethylpiperidinyl-4-(3',5'-di-t-butyl-4'-hydroxybenzoyl)hydrazone
2,2,6,6-tetramethylpiperidinyl-4-(3',5'-dimethyl-4'-hydroxybenzoyl)hydrazone
2,2,6,6-tetramethylpiperidinyl-4-(3'-t-butyl-4'-hydroxy-6'-methylbenzoyl)hydrazone
2,2,6,6-tetramethylpiperidinyl-4-(3',5'-di-t-butyl-4'-hydroxyphenacetyl)hydrazone
2,2,6,6-tetramethylpiperidinyl-4-(3',5'-di-methyl-4'-hydroxy phenacetyl)hydrazone
2,2,6,6-tetramethylpiperidinyl-4-(3'-t-butyl-4'-hydroxy-6'-methylphenacetyl)hydrazone
2,2,6,6-tetramethylpiperidinyl-4-[β-(3',5'-di-t-butyl-4'-hydroxyphenyl)]propionyl hydrazone
2,2,6,6-tetramethylpiperidinyl-4-[β-(3',5'-di-sec-butyl-4'-hydroxyphenyl)]propionyl hydrazone
2,2,6,6-tetramethylpiperidinyl-4-[β-(3',5'-diisopropyl-4'-hydroxyphenyl)]propionyl hydrazone
2,2,6,6-tetramethylpiperidinyl-4-[β-(3'-t-butyl-4'-hydroxy-5'-methylphenyl)]propionyl hydrazone
2,2,6,6-tetramethylpiperidinyl-4-[β-(3'-t-butyl-4'-hydroxy-6'-methylphenyl)]propionyl hydrazone
2,2,6,6-tetramethylpiperidinyl-4-[β-methyl-β-(3',5'-di-t-butyl-4'-hydroxyphenyl)]propionyl hydrazone
2,2,6,6-tetramethylpiperidinyl-4-[β-methyl-β-(3'-t-butyl-4'-hydroxy-5'-methylphenyl)]propionyl hydrazone
2,2,6,6-tetramethylpiperidinyl-4-[β-methyl-β-(3'-t-butyl-4'-hydroxy-6'-methylphenyl)]propionyl hydrazone
2,2,6,6-tetramethylpiperidinyl-4-[β-methyl-β-(3',5'-diisopropyl-4'-hydroxyphenyl)]propionyl hydrazone Examples of salts of compounds of Formula I are those derived from inorganic acids such as phosphates, carbonates, sulphates, chlorides as well as those derived from organic acids such as citrates, acetates, stearates, maleates, oxalates and benzoates.

Compounds of Formula I in which A is —CH$_2$— or —CH$_2$CH$_2$— and wherein $n$ is 1 and compounds of Formula I where $n$ is 0 are preferred. Most preferred are compounds having either the Formula II or III:

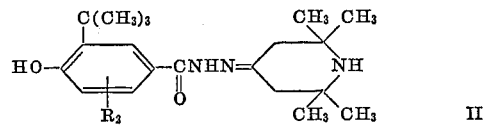

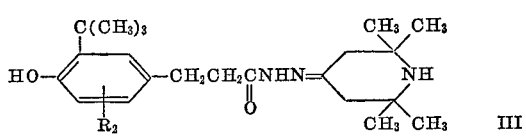

wherein R$_2$ has its previous significance, but wherein R$_2$ is preferably t-butyl and is attached in the position ortho to the hydroxyl group or methyl which is attached in a position ortho- or meta to the hydroxyl group.

The present invention also provides a process in which a compound of Formula I is prepared comprising reacting a compound having the formula

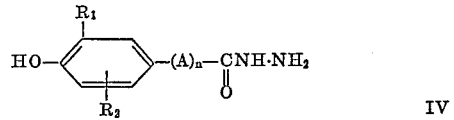

wherein R$_1$, R$_2$, A and $n$ have their previous significance, with a compound having the formula:

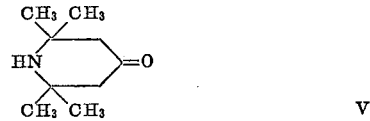

The reaction is conveniently effected by heating the reactants together, preferably in a solvent which is inert under the reaction conditions, for instance an aliphatic alcohol such as ethanol, an aromatic hydrocarbon such as toluene or a dialkyl ether such as diethyl ether. Advantageously, the reaction is conducted at the reflux temperature of the mixture using approximately equimolar proportions of each reactant. When the reaction is complete, the desired product may be purified by conventional techniques.

The present invention still further provides a composition comprising an organic material and a minor proportion of a compound having the Formula I as hereinbefore defined.

The compounds of Formula I provide protection to polymers containing them, not merely against deterioration caused by visible or ultra-violet radiation but also against oxidative degradation caused by thermal effects. Moreover, this stabilisation is achieved without affecting the colour properties of the untreated polymer.

The stabilisers of the invention provide effective stabilisation for low- and high-density polyethylene and polypropylene in particular as well as for polystyrene and also polymers of butene-1, pentene-1, 3-methylbutene-1, hexene-1, 4-methylpentene-1, 4-methylhexene-1 and 4,4-dimethyl-pentene-1, as well as co- and ter-polymers of olefines, particularly of ethylene or propylene.

Other organic material susceptible to degradation by the effects of light, and the properties of which are improved by the incorporation therein of a compound of Formula I, include natural and synthetic polymeric materials, for instance, natural and synthetic rubbers such as homo- and co-polymers of acrylonitrile, butadiene and styrene and thermoplastic polyblends such as a terpolymer of acrylonitrile, butadiene and styrene.

Specific synthetic polymers, include polyvinyl chloride and vinyl chloride co-polymers, polyvinyl acetate as well as condensation polymers derived from ether, ester (ex carboxylic, sulphonic or carbonic acids), amide or urethane groupings. These polymers can form the basis of surface coating media such as paints and lacquers having an oil or resin, for instance an alkyd or polyamide resin, base.

The amount of the compound of Formula I which is incorporated into the organic material in order to achieve maximal protection against degradation by light varies according to the properties of the organic material treated and according to the severity of the light radiation and to the length of exposure. However, for most purposes it is sufficient to use an amount of the compound of Formula I within the range of from 0.01% to 5% by weight, more preferably within the range of from 0.1% to 2% by weight based on the weight of untreated organic material.

Optionally, the composition of the invention may contain further additives, especially those used in polyolefine formulations, such as antioxidants, further light stabilisers, metal complexants/deactivators, pigments, anti-slipping and anti-static agents, fillers, dyes and glass or other fibres.

The compounds of Formula I may be incorporated into a polymeric material by any of the known techniques for compounding additives with a polymer. For example, the compound of Formula I and the polymer may be compounded in an internal mixer. Alternatively, the compound of Formula I may be added as a solution or slurry in a suitable solvent or dispersant, for instance, an inert organic solvent such as methanol, ethanol or acetone to powdered polymer and the whole mixed intimately in a mixer, and the solvent subsequently removed. As a further alternative the compound of Formula I may be added to the polymer during the preparation of the latter, for instance, at the latex stage of polymer production, to provide pre-stabilised polymer material.

Examples of suitable antioxidants are those of the hindered phenol type such as 2,6-ditertiarybutyl-p-cresol, 4,4' - bis(2,6 - ditertiarybutyl-phenol, 4,4'-bis(2,6-diisopropylphenol), 2,4,6 - triisopropyl phenol, and 2,2'-thio-bis(4 - methyl - 6-tertiarybutylphenol)tetrakis[methylene-3(3',5' - dibutyl - 4' - hydroxyphenyl) propionate]methane; n-octadecyl-β-(4'-hydroxy - 3',5' - t - butylphenyl) propionate, esters of thiodipropionic acid, for example dilauryl thiodipropionate; alkyl, aryl or alkaryl phosphites such as triphenyl phosphite, trinonyl phosphite and diphenyldecyl phosphite, and combinations of these antioxidants.

Further light stabilisers include those of the substituted benzotriazole class such as 2-(2'-hydroxy-5'-methyl) phenylbenzotriazole, 2 - (2' - hydroxy-3',5'-di-t-butyl)-5-chlorophenyl-bendotriazole; those of the hydroxy benzophenone type; hindered phenols such as 2',4'-di-t-butylphenyl-3,5-di-t-butyl-4-hydroxy benzoate and suitable metal complexants/deactivators include salicylidene-propylene diamine, 5,5'-methylene-bis-benzotriazole and salts of salicylalaminoguanidine.

As with the compound of Formula I, any further additive is advantageously employed in a proportion within the range of from 0.01% to 5% by weight of untreated organic material.

In combination with an antioxidant suitable for use in inhibiting oxidative deterioration of polyolefines, for instance those of the hindered phenol type, the compounds of Formula I provide extremely effective all round stabilising packages for polyolefines.

Some examples will now be given. Parts and percentages shown therein are by weight unless otherwise stated.

EXAMPLE 1

A mixture of 68.4 parts of β-(3,5-di-t-butyl-4-hydroxyphenyl)-propionic acid hydrazide and 31 parts of triacetonamine in 150 parts of methanol was heated under reflux conditions for 12 hours. On removal of the methanol by distillation under reduced pressure, a solid was left which was recrystallised from petroleum ether to give 48 parts of 2,2,6,6-tetramethyl-piperidinyl-4-[β-(3,5-di-t-butyl-4'-hydroxyphenyl]propionyl hydrazone having melting point of 127° C., and the following elemental analysis by weight:

|  | $C_{26}H_{43}N_3O_2$ | |
| --- | --- | --- |
|  | Found | Required |
| Carbon, percent | 72.12 | 72.80 |
| Hydrogen, percent | 10.02 | 10.01 |
| Nitrogen, percent | 9.60 | 9.79 |

EXAMPLE 2

A 0.15% weight/volume solution of the product of Example 1 in acetone was made up and 40 millilitres of this solution was added to 40 grams of powdered polypropylene which was substantially free from stabilising additives. A further 60 millilitres of acetone was then added to form a slurry which was hand mixed to ensure homogeneity. The solvent was then removed by evaporation in an oven maintained at 80° C.

14 grams of the dried powder were weighed into a mould measuring 6 x 6 x 0.015 inch. The mould and polishing plate were then heated in the press under constant pressure for 5 minutes.

A pressure of 20 tons per square inch was applied for one minute, cooling was commenced and pressure increased so that when the temperature reached 150° C. the pressure was 80 tons per square inch. Cooling was continued until the temperature of the mould reached 50° C. and the mould was released from the press.

The moulded sheet so obtained was exposed to light irradiation in a fademeter device consisting of a circular bank of 28 alternate sunlight and blacklight lamps. The sunlight lamps were 2 feet long 20-watt fluorescent lamps and were characterised by having a peak emission of 3100 angstrom units and blacklight lamps were 2 feet long 40-watt ultra-violet lamps and were characterised by having a peak emission of 3,500 angstrom units. The samples were rotated concentrically about the bank of lamps so that the radiation therefrom was uniformly distributed over the moulded sheet.

The exposed sample was examined periodically and bent through 180° and the time at which it snapped due to embrittlement was noted.

An oven ageing test was also carried out on strips (6.0 x 1.0 inch) of the moulded sheet in an air circulating oven maintained at 150° C. The time taken for the test strip to fail by cracking on flexing the sample through 180° was noted. The results are set out in the following Table I:

TABLE I

| Example | Additive | Heat-ageing test (hours) | Light-ageing test (hours) |
| --- | --- | --- | --- |
|  | None | 2 | 82 |
|  | 2-(2'-hydroxy-3',5'-di-t-butyl)-5-chlorophenylbenzotriazole. | 2 | 250 |
| 2 | 2,2,6,6-tetramethylpiperidinyl-4-[β-(2,6-di-t-butylphenol-4)]propionyl hydrazone. | 44 | 341 |

These results demonstrate the superior properties of a typical composition according to this invention compared with a control composition and also a composition stabilised with a known stabiliser.

EXAMPLE 3

A mixture of 13.2 parts of β-(3,5-diisopropyl-4-hydroxyphenyl) propionic acid hydrazide and 15.50 parts of triacetonamine in 150 parts of methanol was heated under reflux conditions for 12 hours. On removal of the methanol by distillation under reduced pressure, a solid was left which was recrystallised from petroleum ether to yield 5.30 parts of 2,2,6,6-tetramethylpiperidinyl-4-[β-(3',5'-di-sec-butyl-4'-hydroxyphenyl)] propionyl hydrazone as white needles having a melting point of 126 to 127° C. and the following elemental analysis by weight:

|  | $C_{24}H_{39}N_3O_2$ | |
|---|---|---|
|  | Found | Required |
| Carbon, percent | 71.96 | 71.78 |
| Hydrogen, percent | 9.96 | 9.79 |
| Nitrogen, percent | 10.28 | 10.46 |

EXAMPLE 4

A mixture of 7.30 parts of β-(3,5-di-sec-butyl-4-hydroxyphenyl) propionic acid hydrazide and 7.75 parts of triacetonamine in 120 parts of methanol was heated under reflux conditions for 12 hours. On removal of the methanol by distillation under reduced pressure, a solid was left which was recrystallised from petroleum ether to yield 2.0 parts of 2,2,6,6-tetramethylpiperidinyl-4-[β-(3',5'-di-sec-butyl-4'-hydroxyphenyl)] propionyl hydrazone as a white solid having a melting point of 142 to 143° C. and the following elemental analysis by weight:

|  | $C_{26}H_{43}N_3O_2$ | |
|---|---|---|
|  | Found | Required |
| Carbon, percent | 72.86 | 72.68 |
| Hydrogen, percent | 10.03 | 10.09 |
| Nitrogen, percent | 9.87 | 9.78 |

EXAMPLE 5

A mixture of 12.50 parts of β-(3-t-butyl-4-hydroxy-5-methylphenyl) propionic acid hydrazide and 15.50 parts of triacetonamine in 150 parts of methanol was heated under reflux conditions for 12 hours. On removal of the methanol by distillation under reduced pressure, a solid was left which was recrystallised from methyl alcohol to yield 10.50 parts of 2,2,6,6-tetramethylpiperidinyl-4-[β-(3'-t-butyl-4'-hydroxy-5'-methylphenyl)] propionyl hydrazone as a white solid having a melting point of 187 to 188° C. and the following elemental analysis by weight:

|  | $C_{23}H_{37}N_3O_2$ | |
|---|---|---|
|  | Found | Required |
| Carbon, percent | 71.10 | 71.28 |
| Hydrogen, percent | 9.66 | 9.62 |
| Nitrogen, percent | 10.56 | 10.84 |

EXAMPLE 6

100 parts of crystal polystyrene pellets were dry blended with 0.25 parts of the product of Example 1, and the dry blend was homogenised by extrusion. The stabilised pellets so obtained were injection moulded to form placques 2 mm. thick. These placques were exposed for varying periods in a "Xenotest 150" exposure unit, and any yellowing of the placques was measured by determining the yellowness factor by means of the following equation:

$$\text{yellowness factor} = \frac{\Delta T_{(420)} - \Delta T_{(680)}}{T_{(560)}} 100$$

wherein ΔT represents the transmission losses at wavelengths 420 mm. and 680 mm. after exposure in the xenotest apparatus and $T_{(560)}$ represents the transmission value of an unexposed sample at a wavelength of 560 mm.

The results obtained, as well as the results relating to control experiments are recorded in Table II.

TABLE II

|  |  | Yellowness factor | | | | |
|---|---|---|---|---|---|---|
| Example | Additive | 100 hrs. | 1,500 hrs. | 2,000 hrs. | 2,500 hrs. | 3,000 hrs. |
|  | None | 7.8 | 15.7 | 23.5 | 31.4 | 37 |
| 6 | Product of Example 1 | Nil | 1.1 | 5.6 | 6.7 | 10.1 |

EXAMPLE 7

A mixture of 3.96 parts of 3,5-di-t-butyl-4-hydroxybenzoic acid hydrazide and 3.10 parts of triacetonamine was heated at reflux in 60 parts of ethyl alcohol for 17 hours. Removal of the ethyl alcohol solvent by distillation under produced pressure yielded a white solid, which was washed with ether to remove the excess triacetonamine and crystallised from ethyl alcohol to give 1.80 parts of 2,2,6,6-tetramethylpiperidinyl-4-(3',5'-di-t-butyl-4'-hydroxybenzoyl) hydrazone, having a melting point of 174 to 175° C.

The infra-red and nuclear magnetic resonance spectra were consistent with this structure.

EXAMPLE 8

In a similar manner to Example 7, there were reacted 4.90 parts of 3,5-dimethyl-4-hydroxybenzoic acid hydrazide and 9.30 parts of triacetonamine in 150 parts of methyl alcohol to give 6.90 parts of 2,2,6,6-tetramethylpiperidinyl-4-(3',5'-dimethyl-4'-hydroxybenzoyl) hydrazone having a melting point of 128–129° C.

The infra-red and nuclear magnetic resonance spectra were consistent with the structure.

We claim:

1. A compound having the formula

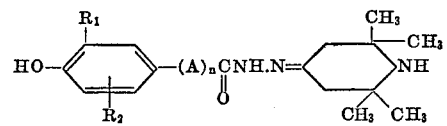

wherein A is —CH₂—, —CH₂CH₂— or

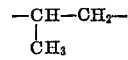

R₁ and R₂ are the same or different and each is a straight- or branched-chain alkyl group having from 1 to 6 carbon atoms and n is 0 or 1.

2. A compound as claimed in claim 1 having the formula

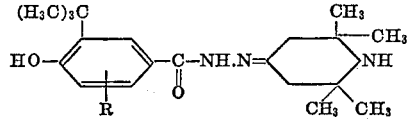

wherein R is a straight- or branched-chain alkyl group having from 1 to 6 carbon atoms.

3. A compound as claimed in claim 1 having the formula

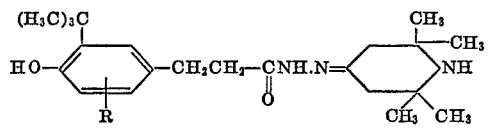

wherein R is a straight- or branched-chain alkyl group having from 1 to 6 carbon atoms.

4. A compound as claimed in claim 1 which is 2,2,6,6-tetramethylpiperidinyl-4-(3',5' - dimethyl-4'-hydroxybenzoyl)-hydrazone.

5. A compound as claimed in claim 1, which is 2,2,6,6-tetramethylpiperidinyl-4-(3',5'-di-t-butyl - 4' - hydroxybenzoyl)-hydrazone.

6. A compound as claimed in claim 1, which is 2,2,6,6-tetramethylpiperidinyl-4-[β-(3',5' - di-t-butyl-4'-hydroxyphenyl)]-propionyl hydrazone.

7. A compound as claimed in claim 1 which is 2,2,6,6-tetramethylpiperidinyl-4[β - (3'5'-di-isopropyl-4'-hydroxyphenyl)] propionyl hydrazone.

8. A compound as claimed in claim 1 which is 2,2,6,6-tetramethylpiperidinyl-4-[β-(3'-t-butyl - 4' - hydroxy - 5'-methylphenyl)] propionyl hydrazone.

References Cited
UNITED STATES PATENTS

| | | | |
|---|---|---|---|
| 2,883,389 | 4/1959 | Jucker et al. | 260—293.76 |
| 3,503,982 | 3/1970 | Murayama et al. | 260—293.66 |
| 3,663,558 | 5/1972 | Murayama et al. | 260—45.8 N |

HENRY R. JILES, Primary Examiner

S. D. WINTERS, Assistant Examiner

U.S. Cl. X.R.

260—293.77, 45.8 N, 559 H